United States Patent
Barp

(10) Patent No.: US 10,759,395 B2
(45) Date of Patent: Sep. 1, 2020

(54) METHOD FOR RESTORING AT LEAST ONE PORTION OF A BODY OF A VALUABLE HISTORIC VEHICLE

(71) Applicant: FERRARI S.p.A., Modena (IT)

(72) Inventor: Luigino Barp, Modena (IT)

(73) Assignee: FERRARI S.P.A., Modena (IT)

( * ) Notice: Subject to any disclaimer, the term of this patent is extended or adjusted under 35 U.S.C. 154(b) by 41 days.

(21) Appl. No.: 16/057,914

(22) Filed: Aug. 8, 2018

(65) Prior Publication Data
US 2019/0047524 A1 Feb. 14, 2019

(30) Foreign Application Priority Data
Aug. 10, 2017 (IT) .................. 102017000092891

(51) Int. Cl.
| | |
|---|---|
| *B60S 5/00* | (2006.01) |
| *C23C 4/02* | (2006.01) |
| *C23C 4/18* | (2006.01) |
| *B23P 6/00* | (2006.01) |
| *C23C 4/129* | (2016.01) |
| *C23C 4/06* | (2016.01) |
| *B23K 9/00* | (2006.01) |
| *C23C 4/08* | (2016.01) |

(52) U.S. Cl.
CPC ............ *B60S 5/00* (2013.01); *B23K 9/0043* (2013.01); *B23P 6/00* (2013.01); *C23C 4/02* (2013.01); *C23C 4/06* (2013.01); *C23C 4/08* (2013.01); *C23C 4/129* (2016.01); *C23C 4/18* (2013.01); *B23P 2700/50* (2013.01)

(58) Field of Classification Search
CPC .... C23C 4/00; C23C 4/02; C23C 4/18; C23C 4/073; B23P 6/00
USPC ............ 29/402.01, 402.09, 402.11, 402.13, 29/402.18, 402.16
See application file for complete search history.

(56) References Cited

U.S. PATENT DOCUMENTS

| | | | | |
|---|---|---|---|---|
| 5,023,987 A | * | 6/1991 | Wuepper ............... | B23P 6/00 156/98 |
| 6,322,730 B1 | * | 11/2001 | Wachtler ............... | B23P 6/02 156/150 |

(Continued)

OTHER PUBLICATIONS

Praxair Surface Technologies, Arch Spray Equipment Solutions, Copyright 2015 (last page) (Year: 2015).*

(Continued)

*Primary Examiner* — Christopher M Koehler
(74) *Attorney, Agent, or Firm* — Cantor Colburn LLP

(57) ABSTRACT

Methods for restoring at least one portion of a body of a valuable historic vehicle generally includes stripping the body portion to clean and roughen a metal surface thereof, wherein the boxy portion is formed of a metal and has a thickness of less than 4 tenths of a millimeter. Stripping includes solvent removal of a paint layer on the metal surface of the body portion followed by corundum blasting to roughen the metal surface. A metal layer is deposited onto the roughened surface by hurling metal particles against the body portion so that they remain embedded therein. Depositing the metal includes hurling metal particles including an anchoring agent to the cleaned and roughened metal surface followed by hurling metal particles including a metal that is similar in composition to the metal body portion. The anchoring agent can be an aluminum alloy.

11 Claims, 1 Drawing Sheet

(56) References Cited

U.S. PATENT DOCUMENTS

| | | | | |
|---|---|---|---|---|
| 7,858,897 B2* | 12/2010 | Beranger | ............ | B23K 15/0066 |
| | | | | 219/121.14 |
| 2003/0049485 A1* | 3/2003 | Brupbacher | ............ | B05D 5/083 |
| | | | | 428/615 |
| 2003/0088980 A1* | 5/2003 | Arnold | ..................... | B23P 6/007 |
| | | | | 29/889.1 |
| 2006/0207080 A1* | 9/2006 | Keate | ......................... | B23P 6/00 |
| | | | | 29/402.07 |
| 2011/0030663 A1* | 2/2011 | Verpoort | .................. | A46B 3/08 |
| | | | | 123/668 |
| 2013/0216722 A1* | 8/2013 | Kusinski | ................... | C23C 4/08 |
| | | | | 427/456 |
| 2014/0304962 A1* | 10/2014 | Gagnon | .................... | B23P 6/00 |
| | | | | 29/402.18 |

OTHER PUBLICATIONS

Accuwright Inductries Inc., "Automotive Coating Services", Oct. 16, 2016 (Oct. 16, 2016), Retrieved from the Internet: URL:http://www.accuwright.com/automotive.php [retrieved on May 16, 2018].
Boc: "LINSPRAY High Performance Coating Techniques 3 Thermal Spraying Contents", Dec. 31, 2010 (Dec. 31, 2010), XP055475078, Retrieved from the Internet: URL:https://www.bocoline.co.uk/internet.lg.lg.gbr/en/images/inspray-High-perormance-coating-tecnique410_39435.pdf?v=5.0 [retrieved on May 15, 2018].
nternational Search Report issued in Italian Patent Application No. IT 201700092891, dated May 16, 2018; 6 pages.

* cited by examiner

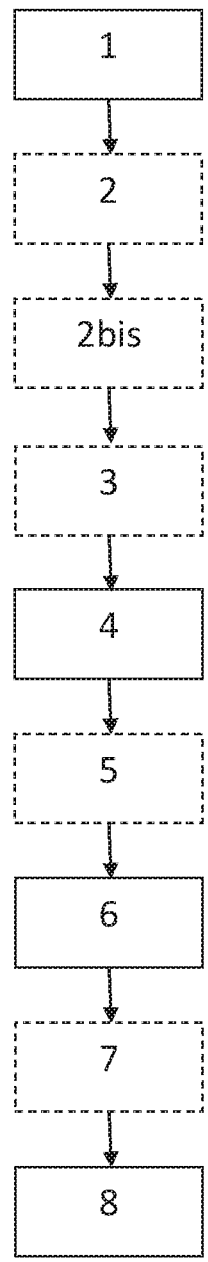

METHOD FOR RESTORING AT LEAST ONE PORTION OF A BODY OF A VALUABLE HISTORIC VEHICLE

CROSS-REFERENCE TO RELATED APPLICATIONS

This application claims priority from Italian Patent Application No. 102017000092891 filed on Aug. 10, 2017, the disclosure of which is incorporated by reference.

FIELD OF THE INVENTION

The present invention relates to the field of restoration of valuable historic vehicles.

STATE OF THE ART

The restoration of valuable vehicles is very complex.

The value of a vehicle is closely connected with the degree of authenticity of the vehicle. This degree of authenticity refers not only to ornaments and details, but also to the metal sheets that define the vehicle body.

Valuable vehicles have often been produced in limited numbers. Even more often, the metal sheets have been made by hand and anyway original spare parts are not available.

The metal sheets, in particular those forming fenders and bumpers, are the most subject to wear, since they are exposed both to crashes and to moisture.

After 50 and more years, the original thickness of about 8 tenths of a millimetre is reduced, at best, to 4 tenths of a millimetre.

Therefore, under these conditions, any reshaping operation of the dents can cause cracks in the metal sheets and therefore a marked deterioration of the situation.

Moreover, oxidation often causes a through corrosion, especially where the metal sheets have been processed more to adhere to predetermined forms, or as a result of the paint loss, which has allowed an easier aggression by external agents.

The metal sheets are often made of aluminium and related alloys, and more rarely of steel.

The known technique to smooth out the dents and to close small openings or cracks provides the use of an iron putty, namely a two-component epoxy putty.

It has a good adhesion but, in the case of large thicknesses, tends to detach from the metal sheet because of the vibrations to which the body of a vehicle is generally subjected.

The known technique, in order to restore larger openings or entire portions of worn metal sheet, provides the welding of new portions.

Occasionally, moreover, it is necessary to cut off portions of metal sheet that are still sound, but too thin to withstand a reshaping or a sanding.

These operations are often risky, since the filler material is often harder than the original metal sheet and, therefore, clumsy operations can cause cracks in the original sheet or an excessive thinning of the same.

The larger the area of intervention, the higher the loss of value of the vehicle, because its degree of originality is lower.

The aforementioned problems are worsened by the fact that technicians who often try their hand at restoring valuable vehicles do not know how to deal with the generalized thinning of the thickness of the metal sheets, which entails the aforesaid executive difficulties, having as only available means for restoring such sheets the usual ones, used by generic coach repairs.

SUMMARY OF THE INVENTION

The object of the present invention is to overcome the aforesaid drawbacks and to indicate a method for restoring at least one portion of a body of a valuable historical vehicle, namely a vehicle of relevance from the collecting point of view.

The basic idea of the present invention is to treat the body by depositing metal particles, thus increasing their thickness. Preferably, the original thickness is restored. The metal particles are deposited by a so-called thermal-spray technique. It consists in heating a target element by means of a flame for tearing off its surface particles. Then, a carrier means projects the particles on the support on which they must be deposited, in particular a portion of a body of a historical vehicle.

The flame is preferably oxyacetylene and the carrier medium is preferably compressed air.

The process is also called "cold", because the particles of deposited material are attached to the support, namely to the portion of the body to be treated, due to the violent impact. This process can also be called "dry", because no glue is used to attach the particles to the support.

The surface particles of the target reach a plastic condition due to the flame. Therefore, thanks on the one hand to the thrust received by the flame and on the other hand to the contribution of the carrier medium, the particles detach from the target and are hurled against the support where they remain embedded, thus creating the aforementioned metallic coating.

The outflow velocity of combustible gases is preferably subsonic. Moreover, the target has the form of a wire and therefore the technique is called thermal-spray/wire-spray, since the target element is a wire having a section ⅛ or 3/16 inches based on the width of the sheet metal surface to be treated.

The surface to be treated must be homogeneous, any cracks must have already been repaired, and any paint must have been removed beforehand.

Any possible paint residues are preferably removed by corundum blasting and advantageously, at the end of the operation, the surface to be treated is rough and ready for the metal deposition process.

The corundum blasting procedure has the purpose of making rough the surface to be treated. The stripping procedure must be preferably carried out by means of solvents, since a complete paint stripping of the surface to be treated by corundum blasting would result in an excessive thinning of the metal sheet to be treated. Therefore, the stripping procedure and the corundum blasting procedure must not be confused.

In the present description, the terms "metal sheet", "body portion", "body", "bodywork" are used interchangeably. If the metal sheet is made of aluminium, the deposited material is aluminium, thus also preserving the original consistency of the metal sheet. If, on the other hand, the sheet is made of steel, a steel of the AISI 316 or 420 type can be used as a support.

Preferably, a preliminary deposition of a thin nickel-aluminium alloy, which acts as an anchoring agent, is carried out prior to the deposition of the metal layer corresponding to the material of the metal sheet.

The present deposition technique can advantageously be carried out on undamaged body portions, albeit thinner, and on body portions to be reshaped.

Advantageously, any operation performed after the deposition turns out to be operationally simpler, since the treated metal sheet is more robust and simpler to handle.

When an edge of an original sheet must be welded, e.g. to put a patch on a through opening, the deposition must be carried out after the electro-welding to ensure an optimal grip of the filler material on the original metal sheet.

The deposition must be checked beforehand by estimating the time for adding the material on a given surface based on
  the extension of the body portion to be coated,
  the thickness of the coating to be deposited, and
  the section of the wire that defines the target element releasing the particles to be deposited on the body portion.

Alternatively, the body of a vehicle or a portion thereof can be scanned by means of a 3D acquisition system and the deposition procedure can be guided by an automatic system for moving the deposition device, thus obtaining a perfectly even metal deposition.

It is the object of the present invention a method for restoring at least one portion of a body of a valuable historic vehicle.

The claims describe preferred variants of the invention, forming an integral part of the present description.

BRIEF DESCRIPTION OF THE FIGURES

Further objects and advantages of the present invention will become clear from the following detailed description of an embodiment thereof (and its variants) and the annexed drawings, given purely as an illustrative and non-limiting example, in which:

FIG. 1 shows a preferred flowchart of the method object of the present invention.

The same reference numbers and letters in the figures identify the same elements or components.

In the context of the present description, the term "second" component does not imply the presence of a "first" component. These terms are in fact used only for clarity's sake and are not to be meant in a restrictive way.

DETAILED DESCRIPTION OF EMBODIMENTS

According to the present invention, at least one portion of the metal sheet of a vehicle body is first stripped off, optionally repaired, then treated with corundum blasting and deposition by means of the so-called thermal-spray technique.

From the sequence of the procedures, it is clear that the corundum blasting is a different and further procedure with respect to the stripping procedure.

A suitable thermal spray technology generally includes the use of a hybrid plasma-kinetic torch assembly including a cathode; a first plasma gas chamber for receiving a first plasma gas that becomes at least partially ionized therein, wherein the first plasma gas chamber comprises a restricted orifice out of which the at least partially ionized first plasma gas exits; a first mixing chamber for receiving a second plasma gas and the at least partially ionized first plasma gas, wherein the second plasma gas and the at least partially ionized first plasma gas are mixable in the first mixing chamber, and wherein the first mixing chamber acts as a first anode, a plasma generator for generating an arc column of plasma between at least the cathode and the first anode; a second mixing chamber for receiving a main gas that is mixable with the second plasma gas and the at least partially ionized first plasma gas that was mixed in the first mixing chamber, wherein the second mixing chamber is dimensioned to receive a plurality of powder particles suspended in a carrier gas; an accelerator assembly for accelerating the mixture of the main gas, the at least partially ionized first plasma gas, the second plasma gas and the powder particles into a high-velocity stream and for directing the high-velocity stream against the surface of the article; whereby the powder particles are caused to adhere to the article and form the coating of particles. The method and operation of the assembly provides the ability to raise the temperature of the combined gas flow and powder particles prior to entering the convergent section of the accelerating nozzle to be heated up to a temperature of as high as 2,500 degrees Fahrenheit which is sufficient to allow for the processing of a full range of materials including from low melting materials to very high melting point material and over a full range of useful powder particle sizes, including nano-sized particles and up 150 microns and greater.

Another suitable thermal spray technology generally includes a plasma transferred wire are thermal spray apparatus. The apparatus generally includes a cathode; a nozzle generally surrounding a free end of said cathode in spaced relation, the nozzle (having a constricted orifice opposite said cathode free end; a source of plasma gas that is directed into said nozzle surrounding said cathode and exiting said constricted nozzle orifice towards the free end of a consumable wire; a wire feed means directing the free end of the consumable wire, having a central axis, to a position for establishing and maintaining a plasma arc and melting the free end of the consumable wire, wherein the central axis of the consumable wire is offset with respect to an axial centerline of the constricting orifice, wherein the consumable wire has an electrical potential opposite of the cathode; means for establishing and operating a plasma transferred wire arc between the cathode and a free end of the consumable wire; and means for melting and atomizing a continually fed free end of the consumable wire into molten metal particles and projecting the particles onto said target surface. The method for operating the apparatus generally include offsetting the central axis of the consumable wire with respect to an axial centerline of the constricting orifice; establishing and operating a plasma transferred wire arc between the cathode and a free end of the consumable wire; and melting and atomizing a continually fed free end of the consumable wire into molten metal particles and projecting the particles onto said target surface.

Before or after the metal deposition, the body or a body portion can be subjected to processing, such as reshaping, to restore its original shape.

Any electro-welding operation must be carried out on the original metal sheet before the metal deposition.

At least one first metal deposition performed with the aforementioned thermal-spray technique is carried out in two steps:
  a first step, in which an aluminium and nickel alloy is deposited, preferably in proportions of 20% and 80%, respectively;
  a second step, in which it is deposited a material similar to the one defining the metal sheet of the body portion subjected to restoration, hereinafter referred to as "homologous".

The first step involves depositing a layer whose thickness is less than one tenth of a millimetre, preferably 5 hundredths of a millimetre, which acts as an anchoring agent for the subsequent deposition of homologous material. The thickness of the homologous material layer may be in the order of tenths of a millimetre up to more than one millimetre.

Therefore, if the metal sheet is originally made of aluminium and its alloys, the homologous material is preferably aluminium, whereas when the metal sheet is originally made of steel, the homologous material is preferably steel, for example, AISI 316 or 420.

The deposition by means of the thermal-spray technique is advantageous because of the high roughness of the processed surface.

This porosity allows an optimal application of the so-called primer, which is generally used for painting body parts.

The primer is normally an anchoring agent that is useful to isolate the sheet metal and to close any porosity in the metal sheet as well as to support further layers of material, such as for example the paint.

One of the most common primers is epoxy, which allows an easy sanding to obtain a desired degree of surface finish.

The target element, from which the material subjected to the deposition is released, preferably has the shape of a wire, which progresses as it is consumed. Its section is preferably of the order of ⅛-³⁄₁₆ inches and is selected based on the width of the surface to be coated.

FIG. 1 shows a flowchart of a preferred example of implementation of the present method.

The blocks represented in broken lines are optional and may be present based on the circumstances.

Step 1: stripping a portion of metal sheet;

Step 2 (optional): cutting off portions of metal sheet, which are unsuitable to be electro-welded;

Step 2*bis* (optional): electro-welding a patch on the backside of the visible surface of the body portion and reshaping said portion of metal sheet;

Step 3 (optional): corundum blasting said portion of metal sheet;

Step 4: metal deposition by using the thermal-spray technique;

Step 5 (optional): reshaping and sanding said portion of metal sheet;

Step 6: applying a primer;

Step 7 (optional): sanding said portion of metal sheet by means of an abrasive cloth;

Step 8: painting said portion of metal sheet.

Further depositions of metallic material can be made according to the circumstances during the processing steps necessary for the complete restoration of at least one portion of the bodywork.

For example, the operator can deposit metal particles during the reshaping i.e. reforming operation of a portion of the bodywork, so that the deposited layer is not subjected to excessive mechanical stresses.

After the first deposition of metal particles, it is not necessary to carry out the aforementioned two-step deposition with the deposition of the aforementioned aluminium-nickel alloy.

Modifications to the described non-limiting example are possible without departing from the scope of the present invention, including all equivalent embodiments for a person skilled in the art.

From the above description, the person skilled in the art is able to manufacture the object of the invention without introducing further constructive details. The elements and features illustrated in the various preferred embodiments, including the drawings, may be combined without however departing from the scope of protection of the present application. What has been described in the state of the art only provides a better understanding of the invention and does not represent a declaration of existence of what has been described. Moreover, if not specifically excluded in the detailed description, what has been described in the state of the art is to be considered as an integral part of the detailed description.

The invention claimed is:

1. A method for restoring at least one portion of a body of a vehicle comprising, in sequence:
   stripping said body portion to clean and roughen a metal surface thereof, wherein said body portion is formed of a metal and has a thickness of less than 4 tenths of a millimeter, and wherein stripping comprises solvent removal of a paint layer on the metal surface of the body portion followed by corundum blasting; and
   depositing a metal layer by hurling metal particles against said body portion so that they remain embedded therein, wherein depositing the metal layer comprises hurling metal particles comprising an anchoring agent to the cleaned and roughened metal surface followed by hurling metal particles comprises a metal similar in composition to the metal body portion.

2. The method according to claim 1, further comprising, in sequence, subsequent to depositing the layer:
   applying an epoxy primer on said body portion, and painting said body portion.

3. The method according to claim 1, further comprising, prior to said deposition of the metal layer, electro-welding of a patch and/or of reshaping of said body portion.

4. The method according to claim 1, wherein said deposition of the metal layer comprises applying an oxyacetylene flame in subsonic regime that impacts a target material having a wire form so as to bring the surface particles of said wire into a plastic state, and applying a compressed air jet to hurl said particles onto said body portion.

5. The method according to claim 4, wherein said wire has a section ranging between ⅛ and ³⁄₁₆ inches.

6. The method according to claim 1, wherein the anchoring agent is at a thickness of about 0.05 millimeters.

7. The method of claim 1, wherein the anchoring agent comprises an aluminum nickel alloy.

8. The method of claim 7, wherein the aluminum nickel alloy comprises about 20% aluminum and about 80% nickel.

9. The method of claim 1, wherein the anchoring agent is at a thickness less than about 1 tenth of a millimeter.

10. The method of claim 1, wherein the metal of the body portion is aluminum and the metal particles comprising the metal similar in composition to the metal body portion comprises aluminum.

11. The method of claim 1, wherein the metal of the body portion is steel and the metal particles comprising the metal similar in composition to the metal body portion comprises steel.

* * * * *